(12) United States Patent
Debe

(10) Patent No.: US 7,687,100 B2
(45) Date of Patent: Mar. 30, 2010

(54) METHOD OF DRY COATING FLOW FIELD PLATES FOR INCREASED DURABILITY

(75) Inventor: Mark K. Debe, Stillwater, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 299 days.

(21) Appl. No.: 11/617,436

(22) Filed: Dec. 28, 2006

(65) Prior Publication Data

US 2008/0160180 A1 Jul. 3, 2008

(51) Int. Cl.
*B05D 1/12* (2006.01)
(52) U.S. Cl. ......................................... 427/11; 427/115
(58) Field of Classification Search .................. 427/11, 427/115
See application file for complete search history.

(56) References Cited

U.S. PATENT DOCUMENTS

| 2,310,002 | A | * | 2/1943 | Van Geel et al. ............ 438/102 |
| 6,828,040 | B2 | | 12/2004 | Cunningham et al. |
| 2004/0005502 | A1 | | 1/2004 | Schlag |
| 2004/0091768 | A1 | | 5/2004 | Abd Elhamid et al. |
| 2005/0098437 | A1 | * | 5/2005 | Shiepe ........................ 205/109 |

FOREIGN PATENT DOCUMENTS

EP 1 271 671 A1 1/2003

\* cited by examiner

*Primary Examiner*—Frederick J Parker
(74) *Attorney, Agent, or Firm*—Philip Y. Dahl

(57) ABSTRACT

A simple and inexpensive method of making a flow field plate that exhibits increased durability under conditions of use is provided. In some embodiments, the method includes the steps of applying a dry carbon powder to a flow field surface of the flow field plate and buffing the carbon powder onto the flow field surface. In some embodiments, the method includes the steps of rubbing a flow field surface of the flow field plate with a dry carbon solid and optionally buffing the carbon onto the flow field surface.

21 Claims, 2 Drawing Sheets

METHOD OF DRY COATING FLOW FIELD PLATES FOR INCREASED DURABILITY

FIELD OF THE DISCLOSURE

This invention relates to methods of coating fuel cell flow field plates so as to increase durability under conditions of use.

BACKGROUND OF THE DISCLOSURE

Some investigators report coating fuel cell flow field plates with doped diamond or diamond-like carbon coatings. U.S. Pat. App. Pub. No. 2004/0005502 may be relevant to such a technology.

Some investigators report coating fuel cell flow field plates with carbon coatings by methods which make use of a liquid dispersing medium. U.S. Pat. App. Pub. No. 2005/0098437 may be relevant to such a technology.

Some investigators report the manufacture of fuel cell flow field plates having a carbon coating derived from pyrolysis of a polymer. U.S. Pat. No. 6,828,040 may be relevant to such a technology.

SUMMARY OF THE INVENTION

Briefly, the present disclosure provides a method of making a coated flow field plate comprising the steps of: a) providing a flow field plate comprising at least one flow field surface; b) applying a dry carbon powder to at least one flow field surface of the flow field plate; and c) buffing the carbon powder onto the flow field surface. Typically the flow field plate is made of metal or carbon composite; more typically metal, and most typically steel, stainless steel, aluminum, titanium, or alloys thereof. Typically the dry carbon powder is graphite powder, amorphous carbon powder, carbon black powder, carbon nanotubes, fullerenes, soot or combinations thereof, and most typically the dry carbon powder is graphite powder.

In another aspect, the present disclosure provides a method of making a coated flow field plate comprising the steps of: a) providing a flow field plate comprising at least one flow field surface; and b) rubbing at least one flow field surface of the flow field plate with a dry carbon solid. The method of this embodiment may additionally include the step of c) buffing the carbon onto the flow field surface. Typically the flow field plate is made of metal, or carbon composite, more typically metal, and most typically steel, stainless steel, aluminum, titanium, or alloys thereof. Typically the dry carbon solid is made of graphite, amorphous carbon, carbon black, carbon nanotubes, fullerenes, soot or combinations thereof, and most typically graphite.

It is an advantage of the present invention to provide a simple, fast and inexpensive method of making a flow field plate that exhibits increased durability under conditions of use.

DETAILED DESCRIPTION

Figure 1A:
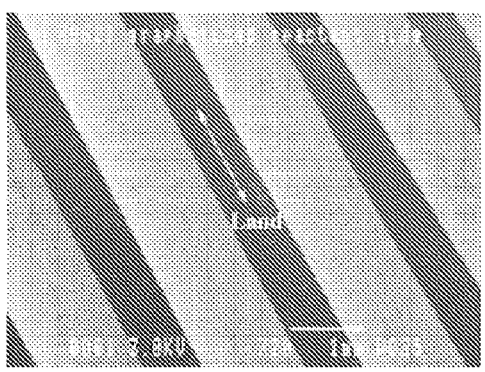
FIG. 1A is a scanning electron micrograph at 20× of the surface of a flow field plate area modified according to the present invention, as described in Example 1.
Figure 1B:
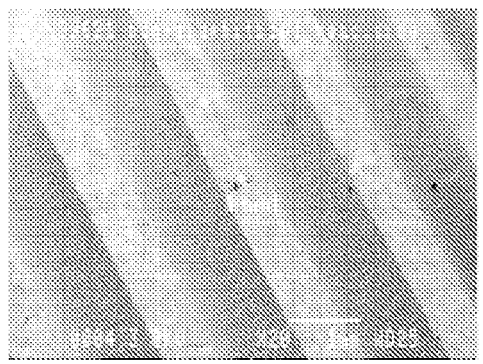
FIG. 1B is a scanning electron micrograph at 20× of the surface of a comparative unmodified flow field plate area.
Figure 2A:
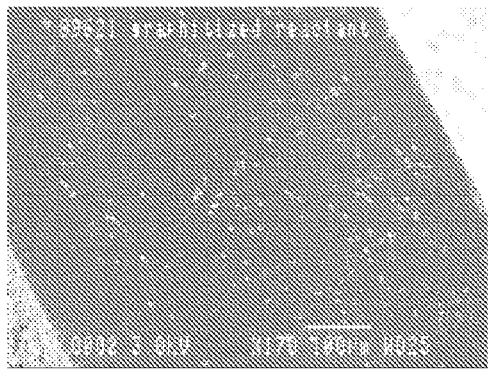
FIG. 2A is a scanning electron micrograph at 170× of the surface of a flow field plate area modified according to the present invention, as described in Example 1.
Figure 2B:
FIG. 2B is a scanning electron micrograph at 170× of the surface of a comparative unmodified flow field plate area.
Figure 3A:
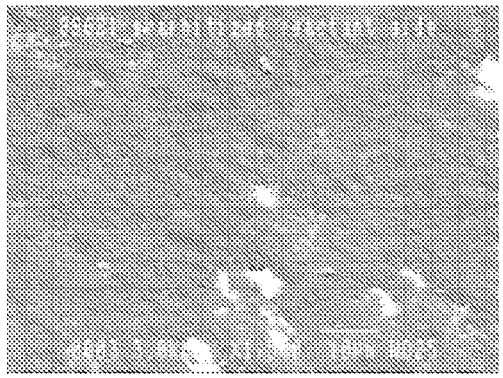
FIG. 3A is a scanning electron micrograph at 1500× of the surface of a flow field plate area modified according to the present invention, as described in Example 1.
Figure 3B:
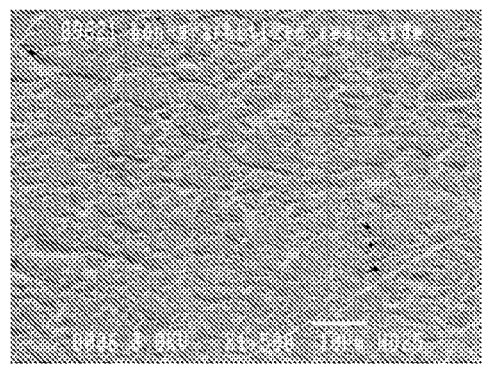
FIG. 3B is a scanning electron micrograph at 1500× of the surface of a comparative unmodified flow field plate area.
Figure 4A:
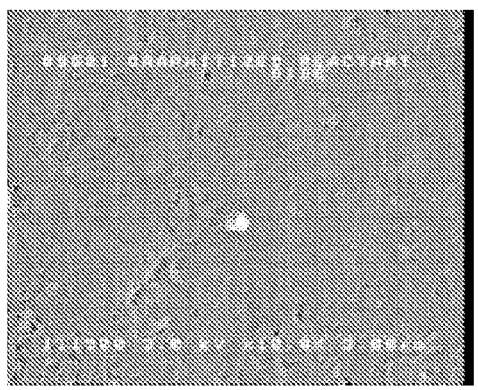
FIG. 4A is a scanning electron micrograph at 10,000× of the surface of a flow field plate area modified according to the present invention, as described in Example 1.
Figure 4B:
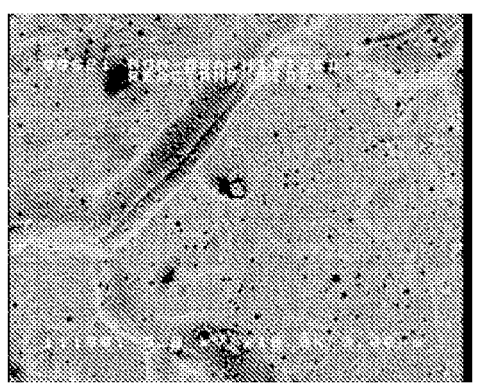
FIG. 4B is a scanning electron micrograph at 10,000× of the surface of a comparative unmodified flow field plate area.

The present disclosure provides a method of making a coated flow field plate (FFP) comprising the steps of: a) providing a flow field plate comprising at least one flow field surface; b) applying a dry carbon powder to at least one flow field surface of the flow field plate; and c) buffing the carbon powder onto the flow field surface. In another aspect, the present disclosure provides a method of making a coated flow field plate comprising the steps of: a) providing a flow field plate comprising at least one flow field surface; and b) rubbing at least one flow field surface of the flow field plate with a dry graphite carbon solid. The method of this embodiment may additionally include the step of c) buffing the carbon onto the flow field surface.

The flow field plate according to the present invention may be useful in electrochemical cells such as fuel cells. Fuel cells are electrochemical cells which produce usable electricity by the catalyzed combination of a fuel, such as hydrogen, methane, formic acid, methanol, or the like, and an oxidant, such as oxygen or air. In polymer electrolyte membrane (PEM) fuel cells, the electrochemical reactions which drive the fuel cell occur in the membrane electrode assembly (MEA). Typical MEA's comprise a polymer electrolyte membrane (PEM) (sometimes called a proton exchange membrane or an ion conductive membrane (ICM)), which functions as a solid polymer electrolyte. One face of the PEM is in contact with an anode electrode layer and the opposite face is in contact with a cathode electrode layer. In typical use, protons are formed at the anode via oxidation of fuel and transported across the PEM to the cathode to react with the oxidant, causing electrical current to flow in an external circuit connecting the electrodes. Each electrode layer includes electrochemical catalysts, typically including platinum metal. The PEM forms a durable, non-porous, electrically non-conductive mechanical barrier between the reactant gases, yet it also passes $H^+$ ions readily. MEA's may additionally include gas diffusion layers (GDL's), located to the outside of the electrodes, which function to facilitate gas transport to and from the anode and cathode electrode materials and conduct electrical current. The GDL is both porous and electrically conductive, and is typically composed of carbon fibers. The GDL may also be called a fluid transport layer (FTL) or a diffuser/current collector (DCC). In some embodiments, the anode and cathode electrode layers are applied to GDL's and the resulting catalyst-coated GDL's sandwiched on either side of a PEM to form a five-layer MEA. The five layers of a five-layer MEA are, in order: anode GDL, anode electrode layer, PEM, cathode electrode layer, and cathode GDL. In more typical embodiments, the anode and cathode electrode layers are applied to either side of the PEM, and the resulting catalyst-coated membrane (CCM) is sandwiched between two GDL's to form a five-layer MEA.

In use in a fuel cell, the MEA's are typically sandwiched between flow field plates (FFP's), sometimes called bipolar plates, monopolar plates, separator plates, distribution plates, end plates, or similar terms. Like the GDL, the FFP's must be highly electrically conductive since they carry all of the current generated in the fuel cell, and thus the bulk resistance and surface resistance of the FFP are typically very low. The FFP's also distribute reactant or product fluids to and from the MEA electrode surfaces, typically through one or more fluid-conducting channels etched, engraved, milled, machined, molded or stamped in the surface(s) facing the MEA(s). These arrays of channels are sometimes designated a flow field. The FFP's may distribute fluids to and from two consecutive MEA's in a stack, with one face directing fuel to the anode side of the first MEA while the other face directs oxidant to the cathode side of the next MEA (and removes product water), hence the term "bipolar plate." Alternately, an FFP may have a front face having a flow field to direct fuel to the anode side of an MEA or oxidant to the cathode side of an MEA and a back face which comprises coolant channels, which may be called a "monopolar plate." Alternately, a monopolar plate may have channels on one side only, to distribute fluids to or from an MEA on only that side.

A fuel cell stack typically comprises one, two or many MEA's stacked alternately with FFP's or combinations of FFP's sufficient to direct fuel to the anode side of each MEA, direct oxidant to the cathode side of each MEA, remove product water from the cathode side of each MEA, conduct electrical current generated by each MEA, and optionally conduct coolant through the stack in coolant channels.

Any suitable FFP may be used in the practice of the present invention. Typical FFP's are made of materials having low electrical resistivity, low electrical surface resistance, low tendency to poison the fuel cell catalyst or the PEM, low weight, low cost, adequate mechanical strength and ease of fabrication. Typical FFP's may be made of a metal or of a carbon composite material. More typically, FFP's used in the practice of the present invention are made of a metal, most typically steel, stainless steel, aluminum, titanium, or alloys thereof. In addition, the metal may exhibit surface alloying which differs from the bulk alloy or may be plated, clad or surface treated with other metals or alloys.

The FFP may incorporate any suitable flow field.

In one embodiment of the present invention, dry carbon powder is applied to at least one flow field surface of a flow field plate. Any suitable dry carbon powder may be used in the practice of the present invention. Typical dry carbon powders may include graphite powder, amorphous carbon powder, carbon black powder, carbon nanotubes, fullerenes, soot and combinations thereof. Most typically, graphite powder is used. Typically the average particle size of the dry carbon powder is 1000 microns or less, more typically 100 microns or less, and more typically 10 microns or less. Typically the dry carbon is sufficiently free of water or other solvents so as to flow freely as a powder. Typically the dry carbon powder contains no water or other solvents except as may be absorbed into individual particles. More typically the dry carbon powder contains no water or other solvents or essentially no water or other solvents, typically less than 5% by weight, more typically less than 1% by weight. Typically the dry carbon powder contains no binder or other polymer or essentially no binder or other polymer, typically less than 5% by weight and more typically less than 1% by weight. In some embodiments, a fluoropolymer, e.g., PTFE, FEP and the like, may be added in amounts of less than 5% by weight and more typically less than 1% by weight.

The dry carbon powder may be applied by any suitable dry method, which may include blowing, spraying, sprinkling, shaking, dropping or the like. In one embodiment, the dry carbon powder is first applied to a buffing surface and then applied to the flow field surface concurrent with the buffing step.

In this embodiment of the present invention, the dry carbon powder may then be buffed onto the flow field surface. The buffing may be accomplished by use of any suitable buffing surface, which typically may include buffing cloths, papers, pads, wheels, brushes, and the like. Buffing surface motion may be generated by any suitable mechanism, which typically may include manual, powered, or automated mechanisms or combinations thereof, and the buffing surface be moved through any suitable motion, which typically may include linear, raster, circular, orbital, or random motions or combinations thereof. Any suitable buffing pressure may be applied.

In another embodiment of the present invention, carbon is applied to at least one flow field surface of a flow field plate by rubbing the flow field surface with a dry carbon solid. Any suitable dry carbon solid may be used, which typically may include solids made of graphite, amorphous carbon, carbon black, carbon nanotubes, fullerenes, soot and combinations thereof. More typically, the dry carbon solid is made of graphite. The dry carbon solid may be in any suitable shape, including rods, sheets, blocks, cones or the like. Typically the dry carbon contains no water or other solvents or essentially no water or other solvents, typically less than 5% by weight, more typically less than 1% by weight. Typically the dry carbon contains no binder or other polymer or essentially no binder or other polymer, typically less than 5% by weight and more typically less than 1% by weight. In some embodiments, a fluoropolymer, e.g., PTFE, FEP and the like, may be added in amounts of less than 5% by weight and more typically less than 1% by weight.

In this embodiment of the present invention, the dry carbon may then be buffed onto the flow field surface as described above.

In some embodiments of the present invention, the FFP surface may be prepared prior to application of carbon by cleaning, e.g., with solvents, detergents, ammonia, bleaches, acids, and the like; or by surface modification, e.g., by abrasion, polishing, plasma treatment, and the like.

Without wishing to be bound by theory, it is believed that the method according to the present invention improves FFP performance and durability by both increasing electrical conductivity at the surface of the plate and reducing generation of passivation or corrosion layers at the surface of the plate by minimizing direct water contact with the plate surface.

This invention is useful, e.g., in the manufacture of durable fuel cell stacks.

Objects and advantages of this invention are further illustrated by the following examples, but the particular materials and amounts thereof recited in these examples, as well as other conditions and details, should not be construed to unduly limit this invention.

EXAMPLES

Unless otherwise noted, all reagents were obtained or are available from Aldrich Chemical Co., Milwaukee, Wis., or may be synthesized by known methods.

Example 1

A part of a stainless steel flow field plate (FFP) measuring approximately 3 cm by 3 cm was treated as follows. About one half of the flow field area was covered with masking tape. Graphite powder (TIMREX KS4, R-111, purchased from TIMCAL Group, Westlake, Ohio, USA) was applied to the uncovered portion of the FFP and vigorously rubbed on by hand using a white paper cloth (WypALL x60, 34770 from Kimberly Clark). The graphite application was repeated. The plate was observed to take on a shiny sheen of smooth graphite where the graphite was applied. Total rubbing time was less than a minute. Excess powder was removed with a small brush and compressed air. Upon removing the tape, a clear demarcation could be seen separating the graphitized side and the clean side. The plate was examined by SEM and FIGS. 1A-4B were generated. FIGS. 1A-4B demonstrate that application of graphite resulted in a smooth and substantially continuous thin layer of graphite on the lands of the plates.

Example 2

Several full sized plates of a fuel cell stack were coated with dry graphite layer using the procedure described in Example 1. Both sides of each plate were coated. Other plates were left uncoated. The plates were then assembled into a fuel cell stack. The stack was then operated at a constant current density of 0.72 A/cm$^2$ at 80° C. under reformate/air (1.5/2.0 stoich) for ~350 hours. The plate-to-plate contact resistance induced voltage drop was monitored periodically during the test for all the cell interfaces and found to be changing very slowly for all at a very small rate of <0.16 mV/hour, with the graphitic coated interfaces showing the lowest rate of 0.091 mV/hour. The stack temperature was then increased to 90° C. for an additional 350 hours, and the rate of voltage increase was on average of 0.15 to 0.28 mV/hr for all the cell types, with the graphitic coating at the highest value.

Figure 5:
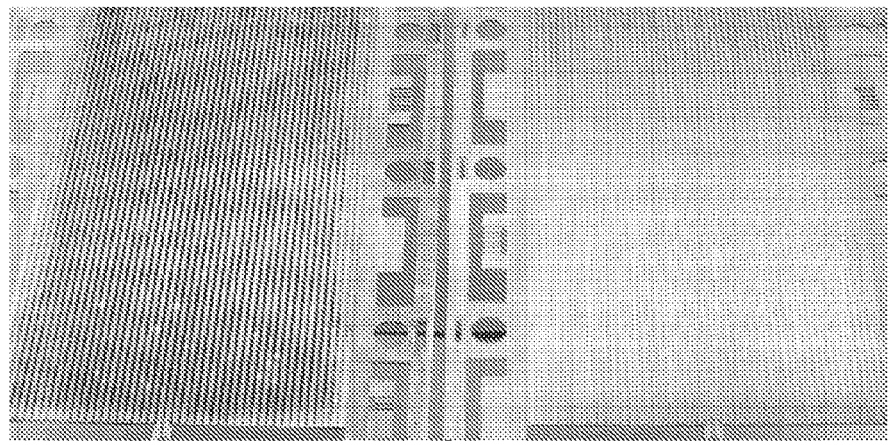
FIG. 5 is a photograph of the coolant channel sides of two flow field plates taken after about 800 hours of stack testing as described in Example 2, one of which was modified according to the present invention before testing (on the right) and one of which was an unmodified comparative plate (on the left).
Figure 6:
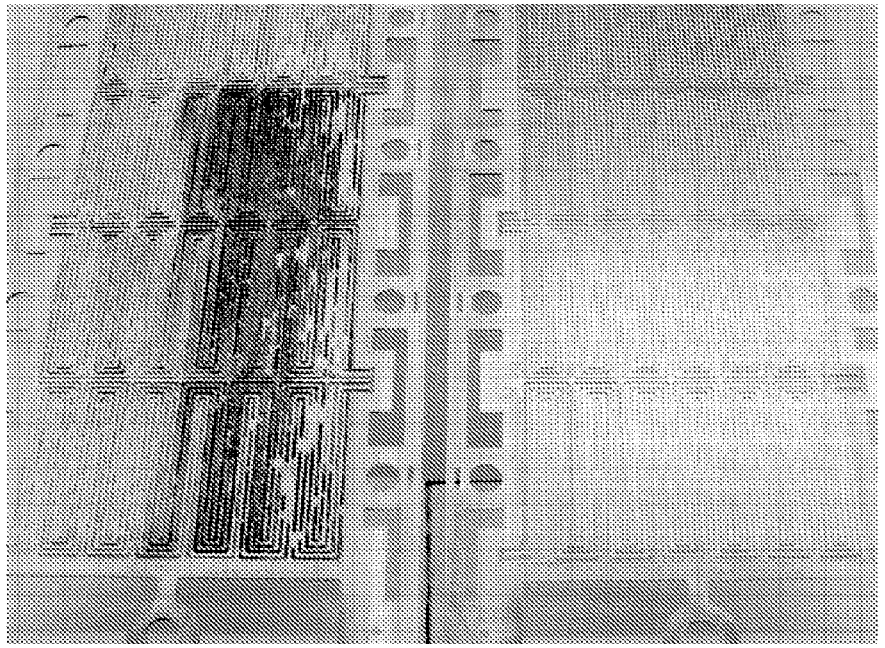
FIG. 6 is a photograph of the reactant channel sides of two flow field plates taken after about 800 hours of stack testing as described in Example 2, one of which was modified according to the present invention before testing (on the right) and one of which was an unmodified comparative plate (on the left).

The stack was then disassembled and the plates inspected for evidence of corrosion. The visual appearance of the plates was immediately seen to be very different. The graphite coated plates remained essentially unchanged in appearance, whereas the untreated control plates exhibited bluish and reddish iron oxide deposits. FIGS. 5 and 6 are photographs of the resulting untreated (comparative) plates (on the left) and graphitized plates (on the right) demonstrating that the graphite treatment appears to have prevented the corrosion on both the coolant side and the reactant sides of the stainless steel plates.

Various modifications and alterations of this invention will become apparent to those skilled in the art without departing from the scope and principles of this invention, and it should be understood that this invention is not to be unduly limited to the illustrative embodiments set forth hereinabove.

I claim:

1. A method of making a coated flow field plate comprising the steps of:
   a) providing a flow field plate comprising at least one flow field surface;
   b) applying a dry carbon powder to at least one flow field surface of the flow field plate; and
   c) buffing the dry carbon powder onto the flow field surface.

2. The method according to claim 1 wherein the flow field plate is made of a material selected from the group consisting of metals and carbon composites.

3. The method according to claim 1 wherein the flow field plate is made of metal.

4. The method according to claim 1 wherein the flow field plate is made of steel, stainless steel, aluminum, titanium, or alloys thereof.

5. The method according to claim 1 wherein the dry carbon powder is selected from the group consisting of graphite powder, amorphous carbon powder, carbon black powder, carbon nanotubes, fullerenes, soot and combinations thereof.

6. The method according to claim 1 wherein the dry carbon powder is graphite powder.

7. The method according to claim 1, additionally comprising the step, prior to step b) of:
   d) preparing at least one flow field surface.

8. The method according to claim 7, wherein said step of preparing at least one flow field surface comprises cleaning at least one flow field surface.

9. The method according to claim 7, wherein said step of preparing at least one flow field surface comprises surface modification of at least one flow field surface.

10. A method of making a coated flow field plate comprising the steps of:
    a) providing a flow field plate comprising at least one flow field surface; and
    b) rubbing at least one flow field surface of the flow field plate with a dry carbon solid.

11. The method according to claim 10, additionally comprising the step of:
    c) buffing the carbon onto the flow field surface.

12. The method according to claim 10 wherein the flow field plate is made of a material selected from the group consisting of metals and carbon composites.

13. The method according to claim 10 wherein the flow field plate is made of metal.

14. The method according to claim 10 wherein the flow field plate is made of steel, stainless steel, aluminum, titanium, or alloys thereof.

15. The method according to claim 10 wherein the dry carbon solid comprises material selected from the group consisting of graphite powder, amorphous carbon powder, carbon black powder, carbon nanotubes, fullerenes, soot, and combinations thereof.

16. The method according to claim 10 wherein the dry carbon solid comprises graphite.

17. The method according to claim 10, additionally comprising the step, prior to step b) of:
    d) preparing at least one flow field surface.

18. The method according to claim 17, wherein said step of preparing at least one flow field surface comprises cleaning at least one flow field surface.

19. The method according to claim 17, wherein said step of preparing at least one flow field surface comprises surface modification of at least one flow field surface.

20. The method according to claim 1 wherein the dry carbon powder includes a fluoropolymer in amounts of less than 5% by weight and more typically less than 1% by weight.

21. The method according to claim 10 wherein the dry carbon solid includes a fluoropolymer in amounts of less than 5% by weight and more typically less than 1% by weight.

* * * * *